United States Patent
Bikulcius et al.

(10) Patent No.: US 6,788,511 B1
(45) Date of Patent: Sep. 7, 2004

(54) DOMAIN POWER NOTIFICATION SYSTEM

(75) Inventors: Simon Bikulcius, Sunnyvale, CA (US); Mark A. Landguth, La Jolla, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 386 days.

(21) Appl. No.: 10/037,735

(22) Filed: Nov. 9, 2001

(51) Int. Cl.$^7$ ................................................ H02H 3/24
(52) U.S. Cl. ................................................ 361/92; 307/64
(58) Field of Search ............................... 361/92; 307/64, 307/65; 713/340; 340/660, 663, 310.01, 310.02, 635; 714/14

(56) References Cited

U.S. PATENT DOCUMENTS 3,852,727 A * 12/1974 Chacon ....................... 340/517
4,912,552 A * 3/1990 Allison et al. ................. 725/21
5,381,554 A * 1/1995 Langer et al. ................. 714/14
5,946,495 A * 8/1999 Scholhamer et al. ........ 713/300
6,651,178 B1 * 11/2003 Voegeli et al. .............. 713/300

* cited by examiner

Primary Examiner—Gregory J. Toatley, Jr.
Assistant Examiner—Zeev Kitov

(57) ABSTRACT

A domain power notification system detects when a power domain experiences a power condition, such as lost power and low-voltage power, and communicates that information to the domains that communicate with the problem domain. As a result, the effected domains stop communicating with the problem domain without passing erroneous information.

20 Claims, 1 Drawing Sheet

DOMAIN POWER NOTIFICATION SYSTEM

BACKGROUND OF THE INVENTION

1. Field of the Invention

The present invention relates to a semiconductor integrated circuit with multiple power domains and, more particularly, to a domain power notification system that prevents erroneous data from being unknowingly received by one domain when another domain experiences a power condition.

2. Description of the Related Art

In a semiconductor integrated circuit that has multiple power domains that communicate with each other, an interruption in the power supply of a transmitting domain can lead to invalid data being received by a receiving domain. When the receiving domain is unaware that the transmitting domain is experiencing a power interruption, the receiving domain can unknowingly receive erroneous signals from the transmitting domain or random signals from the transmission line. In addition to Interruptions in the power supply, a low-voltage condition in the transmitting domain can also lead to invalid data being unknowingly received by the receiving domain.

For example, in a simple two-domain case, a semiconductor integrated circuit can have a 3.3V analog receive domain that receives and digitizes analog signals, and a 1.8V digital processing domain that processes the digitized signals from the analog receive domain. A lost power or low-voltage condition in the analog receive domain can lead to the digital processing domain unknowingly receiving invalid data.

Thus, there is a need for a technique that prevents a domain from unknowingly receiving invalid data when another domain loses power or enters a low-voltage condition.

SUMMARY OF THE INVENTION

The present invention provides a domain power notification system that detects when a domain experiences a power condition, and communicates that information to the domains that communicate with the problem domain. The effected domains stop communicating with the problem domain without passing erroneous information. The power conditions can include, for example, lost power and low-voltage conditions.

A domain power notification system in accordance with the present invention includes a plurality of power domains that receive a corresponding plurality of status signals, and output a corresponding plurality of power signals so that each power domain receives a corresponding status signal and outputs a corresponding power signal. Each domain is independently powered. The power signals represent power supply voltages on the power domains so that each power signal represents a power supply voltage on a power domain. Each power domain is connected to at least one other power domain.

The domain power notification system also includes a domain notification circuit that is connected to a first domain of the plurality of power domains. The domain notification circuit is independently-powered, receives a power signal from the first domain and a second power domain, and outputs a status signal to the first domain. The status signal indicates a power condition of the second power domain.

The present invention also includes a method of operating the domain notification circuit. In accordance with the present invention, the method includes the steps of monitoring a power signal from the second power domain and outputting a status signal to indicate when the power signal from the second power domain falls below a minimum operational voltage.

A better understanding of the features and advantages of the present invention will be obtained by reference to the following detailed description and accompanying drawings that set forth an illustrative embodiment in which the principles of the invention are utilized.

DETAILED DESCRIPTION

Figure 1:
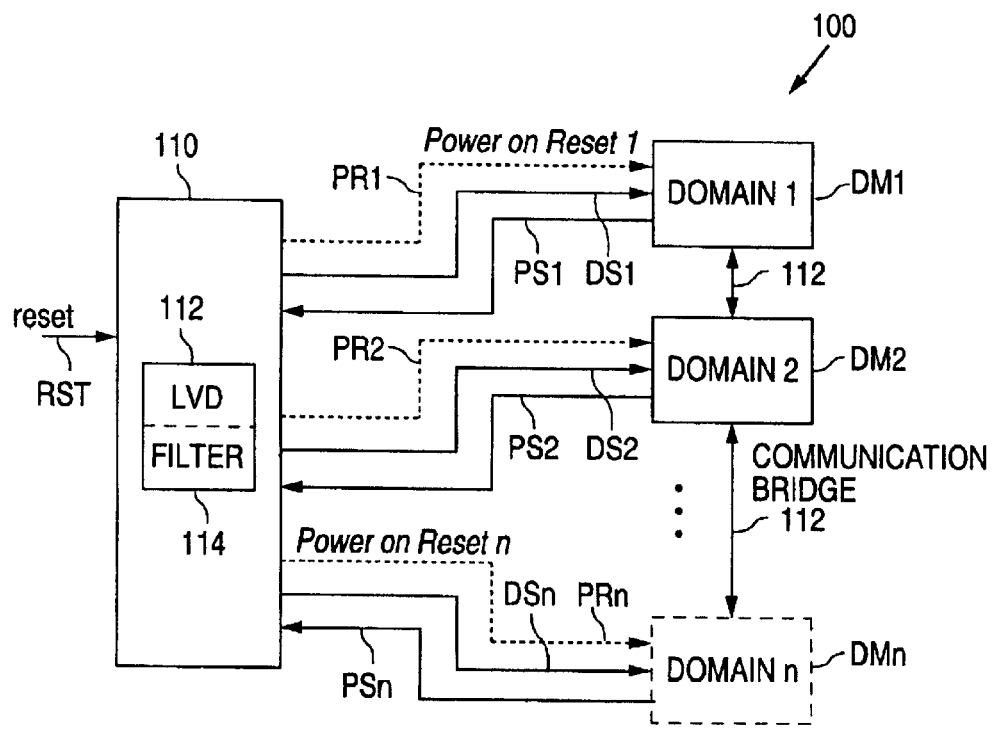
FIG. 1 is a block diagram illustrating a domain power notification system 100 in accordance with the present invention.

FIG. 1 shows a block diagram that illustrates a domain power notification system 100 in accordance with the present invention. As described in greater detail below, the present invention detects when a power domain experiences a power condition, such as lost power and low-voltage power, and communicates that information to the domains that communicate with the problem domain. The effected domains then stop communicating with the problem domain without passing erroneous information.

In the example shown in FIG. 1, system 100 includes a series of independently-powered domains DM1–DMn that are connected to an independently-powered domain notification circuit 110. Domains DM1–DMn output a corresponding series of individual power supply signals PS1–PSn to domain notification circuit 110, and receive a series of domain status signals DS1–DSn and a series of power on reset signals PR1–PRn from domain notification circuit 110.

The individual power supply signals PS1–PSn in this example are the power supply voltages of the domains. As a result, the power supply signals PS1–PSn track changes in the power supply voltages of the domains. For example, if first domain DM1 is connected to an energized 3.3V power supply that is properly functioning, then power supply signal PSI is 3.3V.

If the power supply voltage on the domain drops to two volts, then power supply signal PS1 drops to two volts. Similarly, if second domain DM2 is connected to an energized 12-volt power supply that is properly functioning, then power supply signal PS2 is 12 volts. If the power supply voltage rises to 15 volts, then power supply signal PS2 rises to 15 volts.

In addition, each domain DM includes internal logic that responds to the domain status signal DS and the power on reset signal PR. Further, each domain DM is connected to at least one other domain via a communication bridge 112. Communication bridge 112 can be implemented with a number of serial connections between the domains, a parallel connection to the domains via a bus, or a combination of the two.

Domain notification circuit 110 receives a number of signals, including a reset signal RST. Reset signal RST can be used to reset circuit 110 and/or one or more domains DM via the power on reset signals PR. Domain notification circuit 110 also includes a low-voltage detection (LVD) circuit 112 that receives each of the individual power supply signals PS1–PSn, and detects when the voltage of a power supply signal PS rises above and falls below a minimum operating level for that power supply signal PS.

In addition, LVD circuit 112 outputs the domain status signals DS1–DSn which indicate the power condition of domains DM1–DMn. The domain status signals DS1–DSn can each include the same information, or be customized. For example, the domain status signal DS1 output to first domain DM1 can be customized to change only if the power supply voltage of a domain that transmits data to, or receives data from, first domain DM1 rises above or falls below the minimum operating level of the domain.

In addition, low-voltage detection circuit 112 can also include a signal filter 114 that removes the effect of voltage spikes, thereby preventing low-voltage detection circuit 112 from responding to transient power supply conditions that do not effect the operation of a domain.

In operation, domain notification circuit 110 is a part of the first or one of the first domains to power up, such as the input/output power domain of a semiconductor integrated circuit. After powering up, domain notification circuit 110 monitors the power supply voltages provided to domains DM1–DMn via the individual power supply signals PS1–PSn, and detects when the power supply voltage provided to a domain rises above the minimum operational voltage of the domain, When domain notification circuit 110 detects via an individual power supply signal PS that the power supply voltage provided to a domain is above the minimum operational voltage of the domain, circuit 110 outputs the corresponding power on reset signal PR. In response to the power on reset signal PR, the domain powers up following a predefined sequence. Thus, circuit 110 insures that stable power in excess of the minimum has been provided to a domain before the domain is powered up.

For example, when the power supply voltage on first domain DM1 rises above the minimum operational voltage of first domain DM1, domain notification circuit 110 outputs power on reset signal PR1 to first domain DM1. In response to power on reset signal PR1, first domain DM1 powers up following a predefined sequence.

In addition, a predetermined time after outputting the power on reset signal, domain notification circuit 110 modifies the domain status signals DS1–DSn to indicate that a domain has powered up. Following this, circuit 110 outputs the domain status signals DS1–DSn to each powered up domain DM, or to each relevant powered up domain in the case of customized domain status signals DS. Thus, once a domain powers up, the powered-up domains are informed of the other domains that are powered up and ready to communicate.

For example, a predetermined time after first domain DM1 receives power on reset signal PR1, first domain DM1 receives first domain status signal DS1 from domain notification circuit 110. Domain status signal DS1, in turn, indicates which other of the domains DM2–DMn are powered up and ready to communicate with first domain DM1.

In addition to monitoring the power on reset sequence, or alternately from monitoring the reset sequence (each domain DM can alternately include a power on reset circuit that detects a stable voltage above the minimum and issues the reset command as well as receive a direct reset signal rather than via circuit 110), domain notification circuit 110 also monitors the domains DM1–DMn to detect low voltage and lost power conditions.

When domain notification circuit 110 detects via an individual power supply signal PS that the power supply voltage provided to a domain DM has fallen below the minimum operational voltage of the domain DM, circuit 110 modifies the domain status signals DS1–DSn to indicate that the domain DM has fallen below the minimum required level.

Following this, circuit 110 outputs the domain status signals DS1–DSn to each powered up domain DM, or to each relevant powered up domain in the case of customized domain status signals DS. Thus, once a domain loses power, the other domains that are powered up are notified of this situation.

In response to the notification, each remaining powered up domain marks all current transfers to and from the effected domain as invalid, and ceases all further transmission to and receptions from the effected domain until the domain status signal DS indicates that power has been restored to the effected domain.

For example, assume that first domain DM1 receives a first domain status signal DS1 that indicates that second domain DM2 has entered a low-voltage or lost power condition. In this case, first domain DM1 marks all current transfers to and from domain DM2 as invalid, and ceases all further transmission to and receptions from domain DM2 until domain status signal DS1 indicates that power has been restored to domain DM2.

When power again returns to a domain DM, domain notification circuit 110 again sends out the power on reset signal PR, followed a predetermined time later by an updated domain status signal DS as described above. Thus, domain power notification system 100 insures that power is stable and sufficient before a domain powers up, and/or notifies other domains when a domain enters a low-voltage or lost power condition to prevent erroneous data from being transferred.

Figure 2:
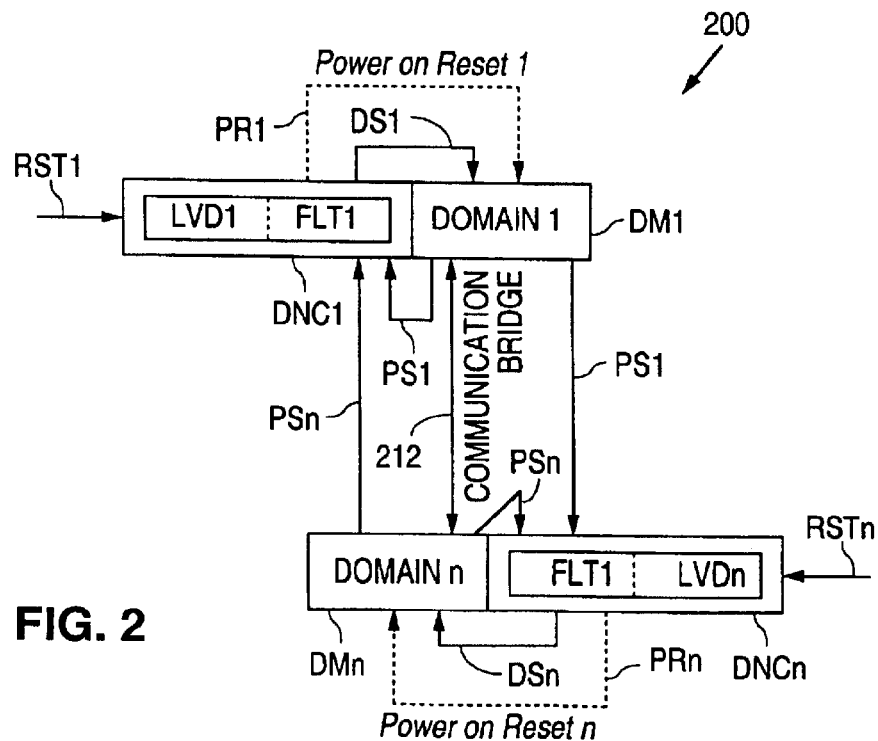
FIG. 2 is a block diagram illustrating a domain power notification system 200 in accordance with an alternate embodiment of the present invention.

FIG. 2 shows a block diagram that illustrates a domain power notification system 200 in accordance with an alternate embodiment of the present invention. In the example shown in FIG. 2, system 200 includes a series of independently-powered domains DM1–DMn, and a corresponding series of independently-powered domain notification circuits DNC1–DNCn that are connected to domains DM1–DMn.

As above, the domains DM1–DMn output a corresponding series of individual power supply signals PS1–PSn. The individual power supply signals PS1–PSn in this example are also the power supply voltages of the domains. As shown in FIG. 2, the domains DM1–DMn output power supply signals PS1–PSn to the corresponding domain notification circuits DNC1–DNCn, and the other domains that communicate with the domains.

For example, assume that first domain DM1 communicates with only the fourth and fifth domains. In this case, first domain DM1 outputs power supply signal PS1 to domain notification circuit DNC1 (the corresponding domain notification circuit), and the domain notification circuits DNC in the fourth and fifth domains.

The domains DM1–DMn also receive a series of domain status signals DS1–DSn and a series of power on reset signals PR1–PRn from the corresponding domain notification circuits DNC1–DNCn. For example, first domain DM1 receives first domain status signal DS1 and a power on reset signal PR1 from domain notification circuit DNC1.

In addition, each domain DM includes internal logic that responds to the domain status signal DS and the power on reset signal PR. Further, each domain DM is connected to at least one other domain via a communication bridge 212. As above, communication bridge 212 can be implemented with a number of serial connections between the domains, a parallel connection to the domains via a bus, or a combination of the two.

The domain notification circuits DNC1–DNCn receive a number of signals, including reset signals RST1–RSTn. Reset signals RST1–RSTn can be used to reset circuits DNC1–DNCn and/or their corresponding domains DM via the power on reset signal PR.

The domain notification circuits DNC1–DNCn also include low-voltage detection circuits LVD1–LVDn that receive the individual power supply signals PS, and detect when the voltage of a power supply signal PS of a domain DM rises above and falls below a minimum operating level of the domain DM. In addition, the low-voltage detection circuits LVD1–LVDn output domain status signals DS1–DSn to their corresponding domain DM. As above, a domain status signal DS indicates the power conditions of the relevant domains DM.

The domain status signals DS1–DSn change if the power supply voltage of a domain DM that transmits data to, or receives data from, the domain DM rises above or falls below the minimum operating level. In addition, the low-voltage detection circuits LVD1–LVDn can also include signal filters FLT1–FLTn that remove the effect of voltage spikes, thereby preventing a low-voltage detection circuit LVD from responding to the transient power supply conditions that do not effect the operation of a domain.

In operation, each domain notification circuit DNC is a part of the first or one of the first domains to power up such as, for example, the input/output power domain of a semiconductor integrated circuit. After powering up, each domain notification circuit DNC monitors the power supply voltages of its corresponding domain DM. For example, first domain notification circuit DNC1 monitors the power supply voltage of first domain DM1, while the nth domain notification circuit DNCn monitors the power supply voltage of the nth domain DMn.

Further, each domain notification circuit DNC detects when the power supply voltage provided to its corresponding domain DM rises above a minimum operational voltage. When a domain notification circuit DNC detects via the power supply signal PS that the power supply voltage provided to its corresponding domain is above the minimum operational voltage, the domain notification circuit DNC outputs the corresponding power on reset signal PR. In response to the power on reset signal PR, the corresponding domain DM powers up following a predefined sequence.

For example, when power supply signal PS1 indicates that the power supply voltage on first domain DM1 has risen above the minimum operational voltage, domain notification circuit DNC1 outputs power on reset signal PR1 to first domain DM1. In response to power on reset signal PR1, first domain DM1 powers up following a predefined sequence. Thus, each domain notification circuit DNC insures that stable power in excess of the minimum has been provided to its corresponding domain before the domain is powered up.

In addition, a predetermined time after outputting the power on reset signal PR, the domain notification circuit DNC outputs the domain status signal DS to its corresponding domain DM, while the domain notification circuits DNC that also received the power supply signal PS output the domain status signals DS to their corresponding domains. The domain status signals DS indicate the power status of the other domains.

For example, a predetermined time after outputting power on reset signal PR1, domain notification circuit DNC1 outputs the domain status signal DS1 to domain DM1, while the domain notification circuits DNC that also received the power supply signal PS1 output the domain status signals DS to their corresponding domains. Thus, once a domain powers up, the powered-up domains are informed of the other domains that are powered up and ready to communicate.

In addition to monitoring the power on reset sequence, or alternately from monitoring the reset sequence (each domain DM can alternately include a power on reset circuit that detects a stable voltage above the minimum and issues the reset command as well as receive a direct reset signal rather than via its corresponding LVD circuit), domain notification circuits DNC1–DNCn also monitor the domains DM1–DMn to detect low voltage and lost power conditions.

Each domain notification circuit DNC detects via the individual power supply signal PS that the power supply voltage provided to a domain DM has fallen below the minimum operational voltage of the domain DM. When this happens, the domain notification circuit DNC modifies the corresponding domain status signal DS to indicate that a domain has fallen below the minimum required powered. Thus, once a domain loses power, the domains that are powered up are notified of this situation.

In response to the notification, each remaining powered up domain DM marks all current transfers to and from the effected domain as invalid, and ceases all further transmission to and receptions from the effected domain DM until the domain status signal DS indicates that power has been restored to the effected domain.

For example, assume that first domain DM1 receives a first domain status signal DS1 that indicates that nth domain DMn has entered a low-voltage or lost power condition via power supply signal PSn. In this case, first domain DM1 marks all current transfers to and from nth domain DMn as invalid, and ceases all further transmission to and receptions from nth domain DMn until domain status signal DS1 indicates that power has been restored to nth domain DMn.

When power again returns to nth domain DMn, domain notification circuit DNCn again sends out the power on reset signal PRn, followed a predetermined time later by updated domain status signals DS1 and DSn as described above. Thus, domain power notification system 200 insures that power is stable and sufficient before a domain powers up, and notifies other domains when a domain enters a low-voltage or lost power condition to prevent erroneous data from being transferred.

Thus, a domain power notification system that insures a proper power up sequence, and notifies remaining domains when a connected domain has power problems has been described. In addition, the domain power notification system prevents erroneous data from being unknowingly received by one domain when another domain experiences a power condition.

It should be understood that various alternatives to the method of the invention described herein may be employed in practicing the invention. Thus, it is intended that the following claims define the scope of the invention and that methods and structures within the scope of these claims and their equivalents be covered thereby.

What is claimed is:

1. A domain power notification system comprising:
   a plurality of power domains that receive a corresponding plurality of status signals, and output a corresponding plurality of power signals so that each power domain receives a corresponding status signal and outputs a corresponding power signal, each domain being independently powered, the power signals representing power supply voltages on the power domains so that each power signal represents a power supply voltage on a power domain, and each power domain being connected to at least one other power domain; and a domain notification circuit connected to a first domain and a second domain of the plurality of power domains, the domain notification circuit being independently-powered and capable of receiving a power signal from the first domain and the second power domain and outputting a status signal to the first domain, the status signal indicating a power condition of the second power domain.

2. The system of claim 1 wherein the domain notification circuit detects when a power signal from the second power domain falls below a minimum operational voltage.

3. The system of claim 2 wherein the domain notification circuit detects when the power signal from the second power domain rises above the minimum operational voltage.

4. The system of claim 3 wherein the domain notification circuit includes a low-voltage detection circuit that detects a voltage level of the power signal from the first domain and a voltage level of the power signal from the second domain, and outputs the status signal to the first domain.

5. The system of claim 4 wherein the low-voltage detection circuit includes a filter that removes voltage spikes from the power signal from the first domain and the power signal from the second power domain.

6. The system of claim 5 wherein the plurality of power domains receive a corresponding plurality of power on reset signals so that each power domain receives a power on reset signal, and powers up in response to the power on reset signal.

7. The system of claim 1 wherein the domain notification circuit detects when a power signal from the first power domain falls below a minimum operational voltage.

8. The system of claim 7 wherein the domain notification circuit detects when a power signal from the first power domain rises above a minimum operational voltage.

9. The system of claim 1 wherein the domain notification circuit detects when a power signal from the first power domain rises above a minimum operational voltage.

10. The system of claim 2 wherein the domain notification circuit detects when a power signal from the first power domain falls below a minimum operational voltage.

11. The system of claim 10 wherein the domain notification circuit detects when a power signal from the first power domain rises above a minimum operational voltage.

12. The system of claim 3 wherein the domain notification circuit detects when a power signal from the first power domain falls below a minimum operational voltage.

13. The system of claim 11 wherein the domain notification circuit detects when a power signal from the first power domain rises above a minimum operational voltage.

14. The system of claim 1 and further comprising a plurality of domain notification circuits that correspond with the plurality of power domains so that each domain notification circuit is connected to a corresponding power domain, the domain notification circuit being one of the plurality of domain notification circuits.

15. The system of claim 14 wherein each domain notification circuit detects when a power signal from another power domain falls below a minimum operational voltage.

16. The system of claim 15 wherein the domain notification circuit detects when the power signal from another power domain rises above the minimum operational voltage.

17. A method of operating a domain power notification system, the system comprising:

a plurality of power domains that receive a corresponding plurality of status signals and output a corresponding plurality of power signals so that each power domain receives a corresponding status signal and outputs a corresponding power signal, each domain being independently powered, the power signals representing power supply voltages on the power domains so that each power signal represents a power supply voltage on a power domain, and each power domain being connected to at least one other power domain; and a domain notification circuit connected to a first domain and a second domain of the plurality of power domains, the domain notification circuit being independently-powered and capable of receiving a power signal from the first domain and the second power domain and outputting a status signal to the first domain, the status signal indicating a power condition of the second power domain, the method comprising:
monitoring a power signal from the second power domain; and
outputting a status signal to indicate when the power signal from the second power domain falls below a minimum operational voltage.

18. The method of claim 17 and further comprising the step of outputting the status signal to indicate when the power signal from the second power domain rises above a minimum operational voltage.

19. The method of claim 17 and further comprising the step of outputting the status signal to indicate when the power signal from the first power domain falls below a minimum operational voltage.

20. The method of claim 19 and further comprising the step of outputting the status signal to indicate when the power signal from the first power domain rises above a minimum operational voltage.

* * * * *